(12) United States Patent
Baber

(10) Patent No.: US 8,596,914 B2
(45) Date of Patent: Dec. 3, 2013

(54) TILE LAYING AND COVERING APPARATUS

(76) Inventor: Thomas Jeffrey Baber, Platte City, MO (US)

( * ) Notice: Subject to any disclaimer, the term of this patent is extended or adjusted under 35 U.S.C. 154(b) by 365 days.

(21) Appl. No.: 12/909,583

(22) Filed: Oct. 21, 2010

(65) Prior Publication Data

US 2012/0099929 A1    Apr. 26, 2012

(51) Int. Cl.
*F16L 1/028* (2006.01)

(52) U.S. Cl.
USPC ............ 405/179; 405/174; 405/180; 405/184

(58) Field of Classification Search
USPC ........................ 405/174, 179, 180, 183, 184
See application file for complete search history.

(56) References Cited

U.S. PATENT DOCUMENTS

| | | | |
|---|---|---|---|
| 3,235,982 A * | 2/1966 | Krohn | 37/347 |
| 3,300,989 A * | 1/1967 | Reising | 405/174 |
| 3,421,609 A * | 1/1969 | Schmunk | 193/2 R |
| 3,664,137 A * | 5/1972 | Lett | 405/50 |
| 3,849,998 A | 11/1974 | Thacker | |
| 3,849,999 A * | 11/1974 | Coffey | 405/178 |
| 4,028,902 A | 6/1977 | Courson et al. | |
| 4,043,135 A | 8/1977 | Hoes et al. | |
| 4,118,940 A | 10/1978 | Beane | |
| 4,142,817 A | 3/1979 | Lazure | |
| 4,159,190 A * | 6/1979 | Duggins et al. | 405/179 |
| 4,159,630 A | 7/1979 | Schuermann | |
| 4,289,424 A | 9/1981 | Shefbuch et al. | |
| 4,462,715 A * | 7/1984 | Ashbaugh | 405/157 |
| 4,537,531 A | 8/1985 | Diefenthaler | |
| 4,647,252 A | 3/1987 | Floy | |
| 4,741,646 A | 5/1988 | Hatch | |
| 4,914,840 A | 4/1990 | Porter | |
| 5,174,685 A | 12/1992 | Buchanan | |
| 5,214,868 A | 6/1993 | Persbacker | |
| 5,281,054 A * | 1/1994 | O'Riordan | 405/182 |
| 6,238,140 B1 | 5/2001 | Boes | |
| 6,637,978 B1 | 10/2003 | Genta | |
| 7,637,697 B1 * | 12/2009 | Holland | 405/180 |
| 2005/0123356 A1 | 6/2005 | Wilkinson | |

* cited by examiner

*Primary Examiner* — Benjamin Fiorello
(74) *Attorney, Agent, or Firm* — Lathrop & Gage LLP

(57) ABSTRACT

Apparatus and methods for forming a substantially uniform path within a trench, laying tile thereon, and covering the tile with dirt from the trench. One apparatus includes a housing, a hook, a pipe insertion frame extending upwardly from the housing, a sloping support wall inside the housing for directing tile from a top side of the housing to an exit at a rear side of the housing, a blade adjacent the housing rear side above the exit, a grip extending above the housing and the pipe insertion frame, and a rigid curved portion extending beneath the housing for forming a substantially uniform path in the trench as the housing is moved along the trench. The blade extends beyond at least one of the housing sidewalls to obtain dirt from the trench. The hook and the grip are configured to engage a machine bucket.

20 Claims, 3 Drawing Sheets

TILE LAYING AND COVERING APPARATUS

CROSS-REFERENCE TO RELATED APPLICATIONS

None.

BACKGROUND OF THE INVENTION

The invention relates generally to the field of flexible pipe ("tile") laying. More specifically, the invention relates to an apparatus for forming a substantially uniform path within a trench, laying tile thereon, and covering the tile with dirt from the sides of the trench.

Tile (e.g., drain tile) may, for example, be laid under an agricultural surface within covered ditches or trenches to provide a channel for transporting water. Drainage using tile is important in agriculture, and in particular to terraced farming, as many crops require specific soil moisture conditions, and the crops' growth may be hindered if there is not a proper amount of water. For example, early in the growing season, the plants are small and do not require much water. As such, the plants need not, and do not, develop their roots significantly to reach for the water, and subsurface water remains plentiful as the plants' requirements are minimal. As plants grow during the growing season, they require and use up more water, and consequently, the water table falls. To reach this lowered water table, the plants develop their roots further; however, the plants may be unable to develop their roots at the pace required to keep up with the quickly decreasing water table. This situation is exaggerated during dry times, and the plants may suffer because of their roots' inability to reach the water.

Drain tile, by transporting the water early in the growing season, effectively lowers the water table and forces the young plants to develop their roots early on, so that the plants can retrieve more water and nutrients throughout the growing season. Moreover, by transporting the excess sub-surface water, drain tile ensures that the soil does not get excessively compacted and harmed by the heavy machinery that is used in farming operations, and that the machinery does not get stuck in the wet soil. The tile is generally installed under the land in a network, and the water seeps into the tile through gaps between sections of tile, perforations within the tile, or surface drains, and subsequently travels within the tile to a desired location. The desired location could, for example, be a water body or a different part of a farm, where the transported water can be collected and distributed as needed. To ensure that the water within the drain tile moves along and does not become stationary, drain tile is generally laid at a specific incline.

It is desirable that the laid drain tile be downwardly inclined without significant upward bulges; otherwise the water may hit against the bulge and come to a stand still. Particularly if the drain tile is being laid manually, it may be laborious and time consuming to position the drain tile and ensure that no bulges are present in the laid drain tile.

SUMMARY

In one embodiment, an apparatus for forming a substantially uniform path within a trench, laying tile thereon, and covering the tile with dirt from the trench, includes: (a) a housing having opposed sidewalls, a front wall, a bottom wall, a rear side, and a top side; a portion of the bottom wall extending past the front wall; the rear side having an exit; a cavity being between the sidewalls, the front wall, the bottom wall, the rear side, and the top side; (b) a hook secured to the bottom wall portion extending past the front wall, the hook configured for engagement with a bucket of a machine; (c) a pipe insertion frame extending upwardly from the housing top side, terminating in a rounded upper perimeter, and defining a pipe insertion cavity; (d) a sloping support wall inside the housing cavity for directing tile from the housing top side to the rear side exit, an upper end of the sloping support wall being in line with the pipe insertion cavity, a lower end of the sloping support wall being in line with the rear side exit, the sloping support wall being arcuate between the sloping support wall upper and lower ends; (e) a blade adjacent the housing rear side above the rear side exit, the blade extending beyond at least one of the housing sidewalls to obtain dirt from at least one side of the trench; (f) a grip extending above the housing top side and the pipe insertion frame, the grip configured for engagement with the machine bucket; and (g) a rigid curved portion extending beneath the housing bottom wall for forming a substantially uniform path in the trench as the housing is moved along the trench.

In another embodiment, a method for forming a substantially uniform path within a trench, laying tile therein, and covering the laid tile with dirt from the trench, includes the steps: (a) providing an apparatus having: (i) a housing having opposed sidewalls, a front wall, a bottom wall, a rear side, and a top side; a portion of the bottom wall extending past the front wall; the rear side having an exit; a cavity being between the sidewalls, the front wall, the bottom wall, the rear side, and the top side; (ii) a hook secured to the bottom wall portion extending past the front wall, the hook configured for engagement with a bucket of a machine; (iii) a pipe insertion frame extending upwardly from the housing top side, terminating in a rounded upper perimeter, and defining a pipe insertion cavity; (iv) a sloping support wall inside the housing cavity for directing tile from the housing top side to the rear side exit, an upper end of the sloping support wall being in line with the pipe insertion cavity, a lower end of the sloping support wall being in line with the rear side exit, the sloping support wall being arcuate between the sloping support wall upper and lower ends; (v) a blade adjacent the housing rear side above the rear side exit, the blade extending beyond at least one of the housing sidewalls to obtain dirt from at least one side of the trench; (vi) a grip extending above the housing top side and the pipe insertion frame, the grip configured for engagement with the machine bucket; and (vii) a rigid curved portion extending beneath the housing bottom wall for forming a substantially uniform path in the trench as the housing is moved along the trench; (b) forming a trench; (c) placing tile adjacent an upper edge of the trench; (d) using a machine bucket to lift the apparatus by the grip and place the apparatus in the trench; (e) placing an end of the tile through the pipe insertion cavity and the housing cavity and out the rear side exit; (f) restraining the tile end; and (g) using the machine bucket to move the apparatus along the trench by pulling the hook. Movement of the apparatus along the trench: (a) causes the rigid curved portion to form a substantially uniform path within the trench; (b) draws more of the tile through the pipe insertion cavity and the housing cavity and out the rear side exit to atop the substantially uniform path, the tile being supported by the sloping support wall while inside the housing cavity; and (c) causes the blade to move dirt from at least one side of the trench to atop the tile located atop the substantially uniform path.

In still another embodiment, an apparatus for forming a substantially uniform path within a trench, laying tile thereon, and covering the tile with dirt from the trench, includes a housing having opposed sidewalls, a front wall, a bottom wall, a rear side, and a top side. The rear side has an exit, and a cavity is between the sidewalls, the front wall, the bottom wall, the rear side, and the top side. A hook is operatively coupled to the housing, and the hook is configured for engagement with a bucket of a machine. A pipe insertion frame extends upwardly from the housing top side, terminates in a rounded upper perimeter, and defines a pipe insertion cavity. A sloping support wall is inside the housing cavity for directing tile from the housing top side to the rear side exit. An upper end of the sloping support wall is generally perpendicular to a lower end of the sloping support wall, and the sloping support wall is arcuate between the sloping support wall upper and lower ends. A blade is adjacent the housing rear side above the rear side exit, and the blade extends beyond at least one of the housing sidewalls to obtain dirt from at least one side of the trench. A grip extends above the housing top side and the pipe insertion frame. The grip is configured for engagement with the machine bucket. A rigid curved portion extends beneath the housing bottom wall for forming a substantially uniform path in the trench as the housing is moved along the trench.

BRIEF DESCRIPTION OF THE DRAWINGS

Illustrative embodiments of the present invention are described in detail below with reference to the attached drawing figures, wherein.

DETAILED DESCRIPTION

Figure 1:
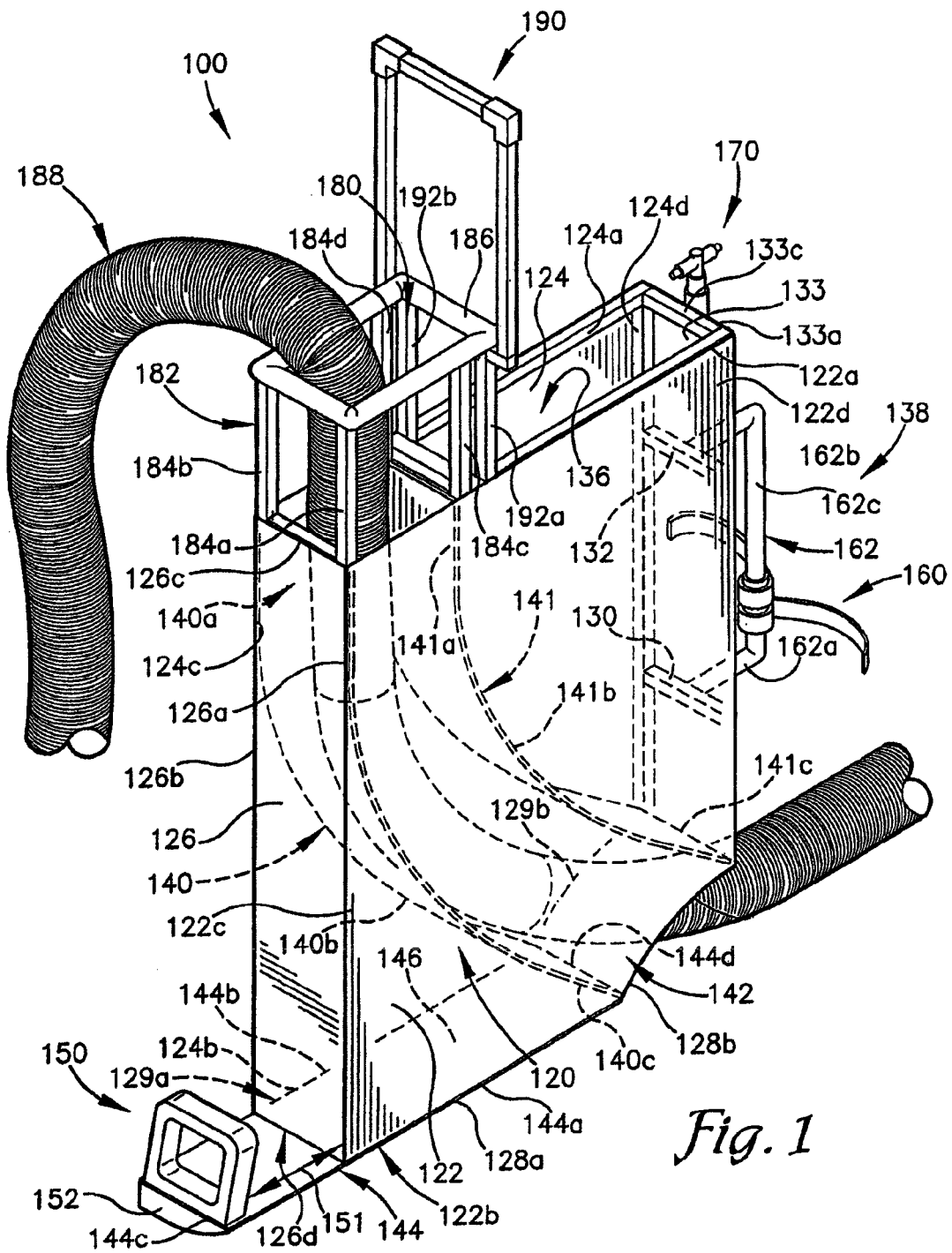
FIG. 1 is a perspective view of an apparatus for laying and covering tile, shown with tile.

Embodiments of the present invention provide systems and methods for forming a substantially uniform path ("groove") within a trench, laying tile (e.g., drain tile) upon the groove, and immediately covering up the laid tile with dirt from the sides of the trench. Looking first to FIG. 1, an embodiment of a tile laying and covering apparatus 110 is shown. The tile layer 110 has a housing 120, a hook 150, blades 160, a laser receiver 170, a pipe insertion cavity 180, and a grip 190.

The housing 120 includes a first sidewall 122 and a second sidewall 124 that opposes sidewall 122. Sidewalls 122, 124 each have a top edge 122a, 124a, a bottom edge 122b, 124b, a first side edge 122c, 124c, and a second side edge 122d, 124d respectively. The bottom edge 122b has a straight portion 128a, and an angularly-offset portion 128b, while the bottom edge 124b has a straight portion 129a, and an angularly-offset portion 129b. The angularly offset portions 128b, 129b may be curved (as shown) or generally linear. A front wall 126 exists between the sidewalls 122, 124 and has two side edges, 126a and 126b, such that the front wall edge 126a is adjacent the first side wall first side edge 122c, while the front wall edge 126b is adjacent the second side wall first side edge 124c. The front wall 126 also has a top edge 126c, and a bottom edge 126d. As shown in FIG. 1, the first side wall 122 and the second side wall 124 have the same approximate dimensions and are generally parallel, while the front wall 126 is generally perpendicular to the first and second side walls 122, 124 respectively.

A bottom wall 144 has two opposing side edges 144a, 144b, a front edge 144c, a rear edge 144d, and an inside straight portion 146. As can be seen from FIG. 1, the bottom wall side edge 144a is adjacent the first sidewall bottom edge 122b, and the bottom wall side edge 144b is adjacent the second sidewall bottom edge 124b. The bottom wall inside straight portion 146 is generally perpendicular to the side walls 122, 124 and the front wall 126. As shown, it may be desirable for the housing 120 to not include a full rear wall at a rear side 138, and for horizontal columns 130, 132 to maintain spacing between the side walls 122, 124. A rear wall portion 133, which is generally parallel to the front wall 126, extends upward from column 132 and has a top edge 133c.

A cavity 136 is formed between the housing walls 122, 124, 126, and 144, and can be viewed from above the housing 120 and from the rear side 138. Sloping support walls 140, 141 are present within the cavity 136 and extend between the first sidewall 122 and the second sidewall 124. The sloping support wall 140 commences at a relatively straight beginning portion 140a at or close to the sidewall top edges 122a, 124a, and the front wall top edge 126c, and extends downwardly and subsequently slopes at a middle sloping portion 140b, and ends adjacent the bottom wall rear edge 144d at a generally straight ending portion 140c. Though not shown in the drawings, the ending portion 140c may extend generally parallel to the bottom wall 144. Similarly, the sloping support wall 141 commences at a relatively straight beginning portion 141a at or close to the sidewall top edges 122a, 124a and adjacent vertical columns 184c, 184d (discussed in more detail below), and extends downwardly and subsequently slopes at a middle sloping portion 141b, and ends adjacent the sidewall edges 122d, 124d at a generally straight ending portion 141c. An opening (or "exit") 142 is formed at the read side 138 between the sloping support wall straight ending portions 140c, 141c sufficient for tile to pass through.

The bottom wall 144 extends past the front wall 126, and the hook 150 is secured to the bottom wall 144 adjacent the bottom wall front edge 144c. As will be discussed in more detail later, the hook 150 can be used to pull the tile layer 110 using machines, such as a backhoe. The hook 150 may be located a sufficient distance 151 from the front wall 126 to ensure that a bucket 210 (FIG. 3) of the backhoe does not accidentally hit the front wall 126 while the bucket 210 is being secured to the hook 150. The hook 150 may be welded to the bottom wall 144 or secured by other known methods, such that the hook 150 does not break off while being used to pull the tile layer 110. The hook 150 shown in FIG. 1 is hollow and square shaped, but it will be obvious to those skilled in the art that the hook 150 may be made of any shape that will allow the hook 150 to be easily secured to a machine used for pulling the tile layer 110.

A rigid curved portion 152 extends beneath the bottom wall 144 for forming a substantially uniform path, as discussed further below. It may be desirable for the curved portion 152 to extend along all, or at least a majority, of the bottom wall straight portion 146.

A blade attachment member 162 extends from the housing 120. While various configurations may be used, two horizontal portions 162a, 162b are shown secured to the columns 130, 132, and a vertical portion 162c extends between the horizontal portions 162a, 162b. Two adjustable blades 160 are shown secured to the vertical portion 162c of the blade attachment member 162. The adjustable blades 160 (FIG. 1) are curved and easily replaceable (i.e., blades 160 of a different configuration or length can readily be secured to the vertical portion 162c). The height of the adjustable blades 160 in relation to the bottom wall 144 can also easily be adjusted, by moving the blades 160 up and down as needed along the vertical portion 162c of the blade attachment member 162. Although not specifically shown in the figures, the blade attachment member 162 may have locks to retain the blades 160 at a particular height on the vertical portion 162c, or the blades 160 themselves may have stoppers, which for example may be tightened to hold the blades 160 at a particular height above the bottom wall 144. Although FIG. 1 shows only two opposing adjustable blades 160, it is readily apparent that the tile layer 110 can have more than two blades 160, or a single blade 160.

The laser pole receiver 170 is secured to the rear wall portion 133, and extends past the top edge 133c of the rear wall portion 133. A laser pole with one or more lasers may be affixed to the laser pole receiver 170, or one or more lights or other instrumentation may be secured to the laser pole receiver 170. The laser or lights can be used to determine the level (i.e. the grade) of the tile layer 110 (e.g., with respect to a ground surface).

The pipe insertion cavity 180 exists within a pipe insertion frame 182. The pipe insertion frame 182 has four vertical columns 184a, 184b, 184c, and 184d. The vertical columns 184a, 184b are adjacent the front wall 126 and respectively extend upwardly from the front wall edges 126a, 126b, and the vertical columns 184c, 184d are respectively secured to the inside of the first and second side walls 122, 124. The vertical columns 184a, 184b, 184c, 184d support a rounded upper perimeter 186, such that a drain tile 188 can be inserted into the pipe insertion cavity 180 through the upper perimeter 186 without the tile 188 being restrained by an edge of the upper perimeter 186.

The grip 190 is adjacent the vertical columns 184c, 184d, and is supported by two vertical columns 192a, 192b. The vertical column 192a is adjacent the vertical column 184c, while the vertical column 192b is adjacent the vertical column 184d. The vertical columns 192a, 192b, much like the vertical columns 184c, 184d, may be respectively secured to the inside of the first and second side walls 122, 124. The grip 190 is configured to allow the bucket 210 (FIG. 3) of a backhoe to easily fit therein and safely lift the tile layer 110. As can be seen in FIG. 1, a small part of the upper perimeter 186 may extend into the bottom of grip 190; alternatively, the upper perimeter 186 may be laterally adjacent a lower crossmember of the grip 190. Although the grip 190 shown in the figures is rectangular, those skilled in the art will appreciate that other shapes may be used as well.

Figure 2:
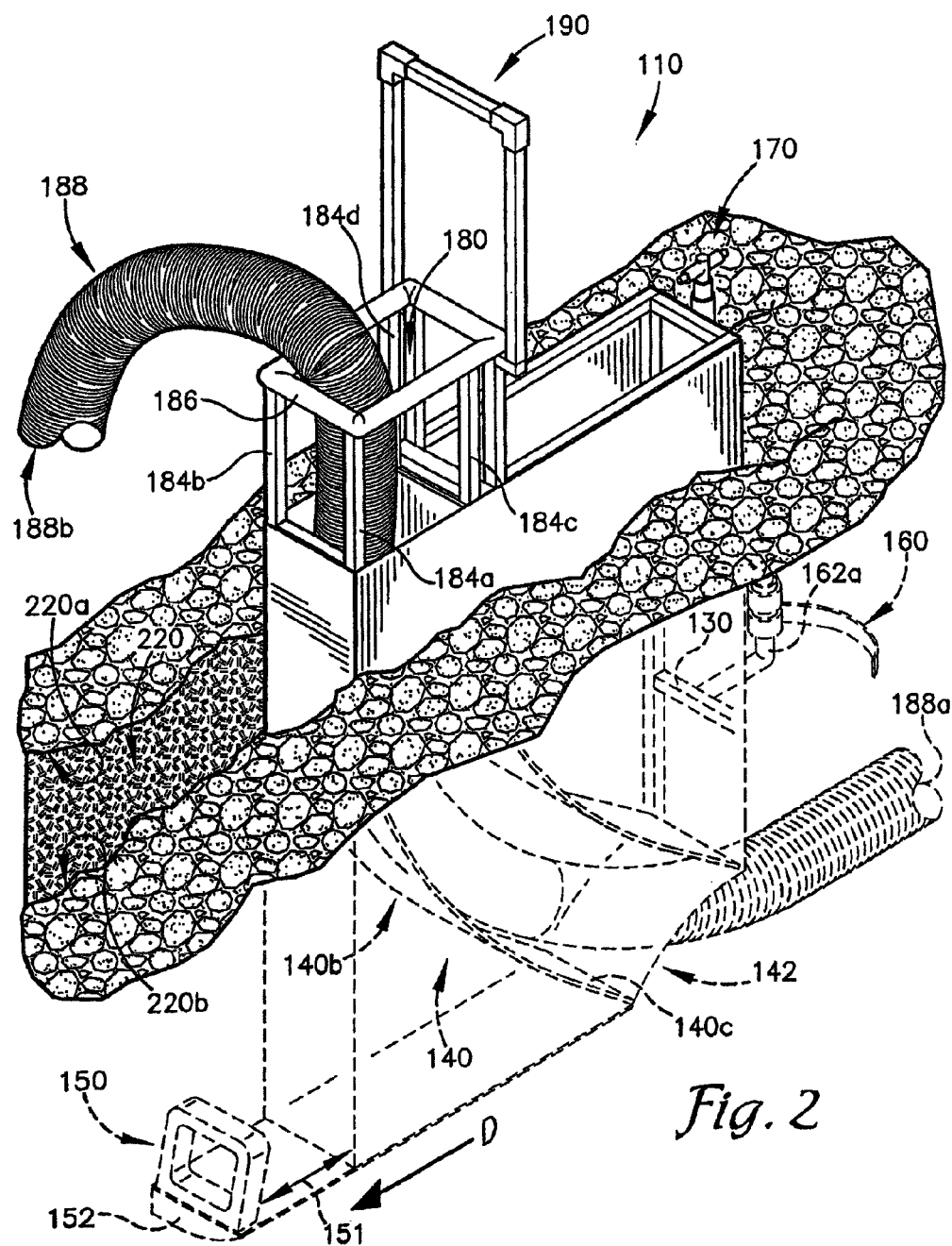
FIG. 2 is another perspective view of the apparatus of FIG. 1, shown lowered into a trench and with tile.
Figure 3:
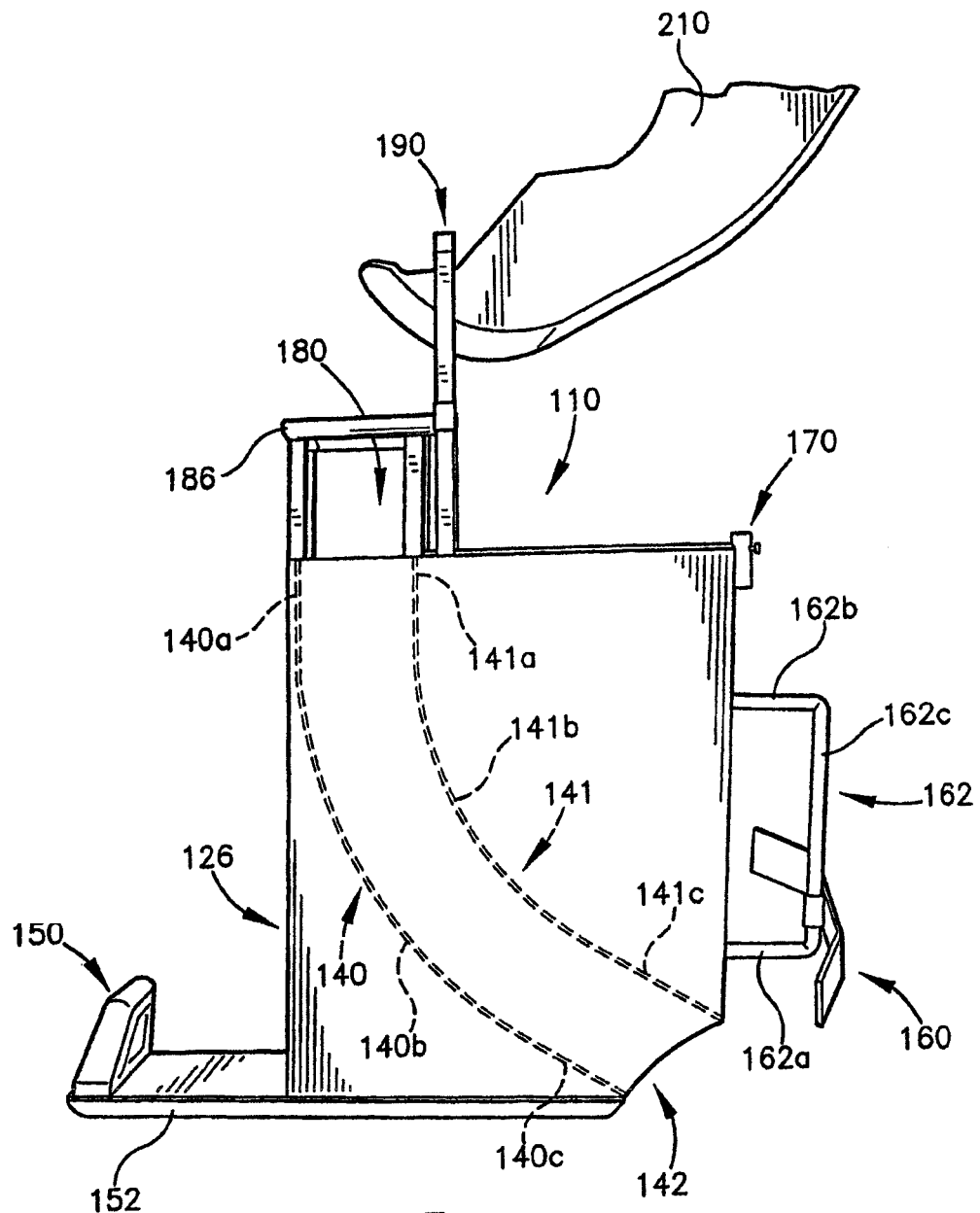
FIG. 3 is a side view of the apparatus of FIG. 1, shown lifted with a bucket of a backhoe.

Attention is now directed to FIG. 2, where the tile layer 100 is shown laying drain tile 188 in a trench 220. After the trench 220 is formed and the tile 188 is placed along the top of the trench 220, the tile layer 110 is placed next to the trench 220. A backhoe or other suitable machine is then used to place the tile layer 110 into the trench 220, with the curved portion 152 at a lower end of the trench 220. More specifically, as shown in FIG. 3, the bucket 210 of a backhoe may be engaged with the grip 190 to lift the tile layer 110 and place it into the trench 220.

Once the tile layer 110 is located in the trench 220, drain tile 188 is inserted into the pipe insertion cavity 180, such that an end of 188a of the drain tile 188 eventually comes out of the opening 142 between the support walls' ending portions 140c, 141c. More particularly, the drain tile end 188a is inserted into the pipe insertion cavity 180 and pushed downwards. The drain tile end 188a first reaches the sloping support walls' beginning portions 140a, 141a (see FIG. 1), and as more drain tile 188 is inserted, the drain tile end 188a slides down to the support walls' middle sloping portions 140b, 141b; after then reaching the sloping walls' end portions 140c, 141c, the drain tile end 188a ultimately comes out the opening 142 to the bottom of the trench 220. The height of the vertical columns 184a, 184b, 184c, and 184d ensures that the drain tile 188 slides down smoothly onto the support walls 140, 141 as the tile layer 110 is pulled. Moreover, the presence of two sloping support walls 140, 141 prevents bulges or ripples from being formed in drain tile 188. Although FIG. 2 shows the drain tile 188 ending at an end 188b, it will readily be understood that the end 188a of any length of drain tile 188 can be inserted into the pipe insertion cavity 180. The length of the drain tile 188, for example, may correspond to the length of the trench 220 wherein the tile 188 is being laid.

Either before or after the tile 188 is initially fed through the tile layer 110, the bucket 210 (FIG. 3) is secured to the hook 150. As noted above, the distance 151 between the hook 150 and the front wall 126 may prevent the bucket 210 from accidentally hitting the front wall 126. The bucket 210, while secured to the hook 150, is pulled horizontally in a direction d along the trench 220. Pulling the hook 150 in turn pulls the tile layer 110 in the same direction.

As the tile layer 110 moves in the direction d along the trench, the curved portion 152 forms a substantially uniform curved path ("groove") at the bottom of the trench 220. In the meantime, as the tile layer 110 is pulled, the drain tile 188 slides along the curved support walls 140, 141 and is laid within this groove. Meanwhile, the blades 160 dig into sides 220a, 220b of the trench 220, and as the tile layer 110 is pulled in direction d, the blades 160 cause dirt from the sides 220a, 220b to be deposited on top of the laid tile 188. With the laid tile 188 being held down by the deposited dirt, the tile end 188a is biased from moving along with the tile layer 110. Thus, as the tile layer 110 is pulled in direction d, more of the tile 188 is forced to travel along the sloping support walls 140, 141 and be laid within the groove of the trench 220. Notably, due to the pipe insertion cavity 180, the curved support walls 140, 141 and the blades 160, no external assistance is needed to feed the tile 188 into the insertion cavity 180 after the process begins. Moreover, it may also be important to cover the drain tile 188 promptly once it is laid into the ground, lest conditions such as rain or heavy winds disturb the placement of the smoothly laid tile 188 and render it less able to transport water effectively.

Lights or lasers placed in the laser pole receiver 170 can be utilized to ensure that the tile 188 is being laid at the proper grade. If not, the process can immediately be stopped to correct the problem, which may, for example, be that the trench 220 has been dug improperly. Moreover, if, for example, a utility pole is present at a side of the trench 220a, 220b, or if the dirt at a particular height in the trench 220 has large rocks, the height and presence of the blades 160 can readily be adjusted to avoid any unintended damage.

Once the end of the trench 220 is reached, or once the tile 188 has been laid in the area where desired, the tile layer 110 can simply be pulled out by engaging the bucket 210 (FIG. 3) with the grip 190. The last of the tile 188 can be covered up with dirt from the sides 220a, 220b of the trench 220 manually, or by dirt that has otherwise been procured for this purpose. The angularly-offset portions 128b, 129b allow the tile layer 110 to be rotated or "swung" by the bucket 210, either when in use with the grip 190 or the hook 150, without damage to the tile layer 110.

Thus, the tile layer 110 may allow one to efficiently lay drain tile 188 within a groove that the tile layer 110 forms within the trench 220, ensure that the tile 188 being laid is smooth and without bulges, cover the drain tile 188 as it is being laid without the immediate need for extra dirt or significant effort, and allow for the flexibility of digging the cover-up dirt at different heights from the trench sides 220a, 220b. Moreover, the tile layer 110 is not limited to a single diameter of the drain tile 188, and the easily replaceable blades allow for the tile layer 110 to be used in trenches of varying widths.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. Further, not all steps listed need be carried out in the specific order described.

I claim:

1. An apparatus for forming a substantially uniform path within a trench, laying tile thereon, and covering the tile with dirt from the trench, the apparatus comprising:
    a housing having opposed sidewalls, a front wall, a bottom wall having a straight portion and an angularly offset portion, a rear side, and a top side; the straight portion of the bottom wall extending past the front wall; the rear side having an exit; a cavity being between the sidewalls, the front wall, the bottom wall, the rear side, and the top side;
    a hook secured to the bottom wall straight portion, the hook configured for engagement with a bucket of a machine;
    a pipe insertion frame extending upwardly from the housing top side, terminating in a rounded upper perimeter, and defining a pipe insertion cavity;
    a lower sloping support wall inside the housing cavity for directing tile laying thereon from the housing top side to the rear side exit, an upper end of the lower sloping support wall being in line with the pipe insertion cavity, a lower end of the lower sloping support wall being in line with the rear side exit and terminating at a first end of the bottom wall angularly offset portion, the lower sloping support wall being arcuate between the lower sloping support wall upper and lower ends;
    an upper sloping support wall inside the housing cavity for directing tile from the housing top side to the rear side exit, a lower end of the upper sloping support wall being adjacent the rear side exit and terminating at a second end of the bottom wall angularly offset portion;
    a blade adjacent the housing rear side above the rear side exit, the blade extending beyond at least one of the housing sidewalls to obtain dirt from at least one side of the trench;
    a grip extending above the housing top side and the pipe insertion frame, the grip configured for engagement with the machine bucket; and
    a rigid curved portion extending beneath the housing bottom wall for forming a substantially uniform path in the trench as the housing is moved along the trench.

2. The apparatus of claim 1, wherein the housing bottom wall straight portion is generally perpendicular to the housing front wall.

3. The apparatus of claim 2, wherein the grip is located between the pipe insertion frame and the housing rear side.

4. The apparatus of claim 3, further comprising a blade attachment member extending from the housing rear side, the blade being adjustably coupled to the blade attachment member whereby the blade is positionable at a plurality of heights above the housing bottom wall.

5. The apparatus of claim 4, wherein the blade extends beyond both housing sidewalls to obtain dirt from two sides of the trench.

6. The apparatus of claim 5, wherein the rounded upper perimeter of the pipe insertion frame is separated from the lower sloping support wall upper end to direct tile passing through the pipe insertion cavity to contact the lower sloping support wall substantially continuously from the lower sloping support wall upper end to the lower sloping support wall lower end.

7. The apparatus of claim 6, wherein the blade is a plurality of blades.

8. The apparatus of claim 7, further comprising a laser receiver secured to the housing.

9. The apparatus of claim 8, wherein the laser receiver is adjacent the housing rear side and the housing top side.

10. The apparatus of claim 2, wherein the rounded upper perimeter of the pipe insertion frame is separated from the lower sloping support wall upper end to direct tile passing through the pipe insertion cavity to contact the lower sloping support wall substantially continuously from the lower sloping support wall upper end to the lower sloping support wall lower end.

11. The apparatus of claim 1, wherein the rounded upper perimeter of the pipe insertion frame is separated from the lower sloping support wall upper end to direct tile passing through the pipe insertion cavity to contact the lower sloping support wall substantially continuously from the lower sloping support wall upper end to the lower sloping support wall lower end.

12. A method for forming a substantially uniform path within a trench, laying tile therein, and covering the laid tile with dirt from the trench, the method comprising:
    providing an apparatus having:
        (a) a housing having opposed sidewalls, a front wall, a bottom wall having a straight portion and an angularly offset portion, a rear side, and a top side; the straight portion of the bottom wall extending past the front wall; the rear side having an exit; a cavity being between the sidewalls, the front wall, the bottom wall, the rear side, and the top side;
        (b) a hook secured to the bottom wall straight portion, the hook configured for engagement with a bucket of a machine;
        (c) a pipe insertion frame extending upwardly from the housing top side, terminating in a rounded upper perimeter, and defining a pipe insertion cavity;
        (d) a sloping support wall inside the housing cavity for directing tile from the housing top side to the rear side exit, an upper end of the sloping support wall being in line with the pipe insertion cavity, a lower end of the sloping support wall being in line with the rear side exit and terminating at an end of the bottom wall angularly offset portion, the sloping support wall being arcuate between the sloping support wall upper and lower ends;
        (e) a blade adjacent the housing rear side above the rear side exit, the blade extending beyond at least one of the housing sidewalls to obtain dirt from at least one side of the trench;
        (f) a grip extending above the housing top side and the pipe insertion frame, the grip configured for engagement with the machine bucket; and (g) a rigid curved portion extending beneath the housing bottom wall for forming a substantially uniform path in the trench as the housing is moved along the trench;

forming a trench;

placing tile adjacent an upper edge of the trench;

using the machine bucket to lift the apparatus by the grip and place the apparatus in the trench;

placing an end of the tile through the pipe insertion cavity and the housing cavity and out the rear side exit;

restraining the tile end; and using the machine bucket to move the apparatus along the trench by pulling the hook;

wherein movement of the apparatus along the trench:
  (a) causes the rigid curved portion to form a substantially uniform path within the trench;
  (b) draws more of the tile through the pipe insertion cavity and the housing cavity and out the rear side exit to atop the substantially uniform path, the tile being supported by the sloping support wall while inside the housing cavity; and
  (c) causes the blade to move dirt from at least one side of the trench to atop the tile located atop the substantially uniform path.

13. An apparatus for forming a substantially uniform path within a trench, laying tile thereon, and covering the tile with dirt from the trench, the apparatus comprising:

a housing having opposed sidewalls, a front wall, a bottom wall having a straight portion and an angularly offset portion, a rear side, and a top side; the rear side having an exit; a cavity being between the sidewalk, the front wall, the bottom wall, the rear side, and the top side;

a hook operatively coupled to the housing, the hook configured for engagement with a bucket of a machine;

a pipe insertion frame extending upwardly from the housing top side, terminating in a rounded upper perimeter, and defining a pipe insertion cavity;

a sloping support wall having an upper end and a lower end, the sloping support wall being inside the housing cavity for directing tile from the housing top side to the rear side exit, the sloping support wall being arcuate between the sloping support wall upper and lower ends, the lower end of the sloping support wall terminating at an end of the bottom wall angularly offset portion;

a blade adjacent the housing rear side above the rear side exit, the blade extending beyond at least one of the housing sidewalls to obtain dirt from at least one side of the trench;

a grip extending above the housing top side and the pipe insertion frame, the grip configured for engagement with the machine bucket; and a rigid curved portion extending beneath the housing bottom wall for forming a substantially uniform path in the trench as the housing is moved along the trench.

14. The apparatus of claim 13, wherein the grip is located between the pipe insertion frame and the housing rear side.

15. The apparatus of claim 14, wherein the rounded upper perimeter of the pipe insertion frame is separated from the sloping support wall upper end to direct tile passing through the pipe insertion cavity to contact the sloping support wall substantially continuously from the sloping support wall upper end to the sloping support wall lower end.

16. The apparatus of claim 15, wherein the rounded upper perimeter of the pipe insertion frame is separated from the sloping support wall upper end to direct tile passing through the pipe insertion cavity to contact the sloping support wall substantially continuously from the sloping support wall upper end to the sloping support wall lower end.

17. An apparatus for forming a substantially uniform path within a trench, laying tile thereon, and covering the tile with dirt from the trench, the apparatus comprising:

a housing having opposed sidewalls, a front wall, a bottom wall, a rear side, and a top side; a portion of the bottom wall extending past the front wall; the rear side having an exit; a cavity being between the sidewalls, the front wall, the bottom wall, the rear side, and the top side;

a hook secured to the bottom wall portion extending past the front wall, the hook configured for engagement with a bucket of a machine;

a pipe insertion frame extending upwardly from the housing top side, terminating in a rounded upper perimeter, and defining a pipe insertion cavity;

a sloping support wall inside the housing cavity for directing tile from the housing top side to the rear side exit, an upper end of the sloping support wall being in line with the pipe insertion cavity, a lower end of the sloping support wall being in line with the rear side exit, the sloping support wall being arcuate between the sloping support wall upper and lower ends;

a blade adjacent the housing rear side above the rear side exit, the blade extending beyond at least one of the housing sidewalls to obtain dirt from at least one side of the trench;

a grip extending above the housing top side and the pipe insertion frame, the grip configured for engagement with the machine bucket;

a rigid curved portion extending beneath the housing bottom wall for forming a substantially uniform path in the trench as the housing is moved along the trench; and a blade attachment member extending from the housing rear side, the blade being adjustably coupled to the blade attachment member whereby the blade is positionable at a plurality of heights above the housing bottom wall;

wherein the housing bottom wall includes a straight portion generally perpendicular to the housing front wall;

wherein the grip is located between the pipe insertion frame and the housing rear side.

18. The apparatus of claim 17, wherein the blade extends beyond both housing sidewalk to obtain dirt from two sides of the trench.

19. The apparatus of claim 18, wherein the rounded upper perimeter of the pipe insertion frame is separated from the sloping support wall upper end to direct tile passing through the pipe insertion cavity to contact the sloping support wall substantially continuously from the sloping support wall upper end to the sloping support wall lower end.

20. The apparatus of claim 19, further comprising a laser receiver secured to the housing adjacent the housing rear side and the housing top side;

and wherein the blade is a plurality of blades.

* * * * *